United States Patent
Thornton

[15] 3,707,641
[45] Dec. 26, 1972

[54] DISCHARGE DEVICE WHICH UTILIZES A MIXTURE OF TWO FLUORESCENT MATERIALS

[72] Inventor: William A. Thornton, Cranford, N.J.
[73] Assignee: Westinghouse Electric Corporation, Pittsburgh, Pa.
[22] Filed: Dec. 22, 1970
[21] Appl. No.: 100,680

[52] U.S. Cl. .................................................. 313/109
[51] Int. Cl. .............................................. H01j 61/44
[58] Field of Search ...................................... 313/109

[56] References Cited

UNITED STATES PATENTS

| 3,602,758 | 8/1971 | Thornton ............................. 313/109 |
| 3,569,764 | 3/1971 | Hanada et al. ...................... 313/109 |
| 3,602,757 | 8/1971 | Wachtel ............................... 313/109 |
| 2,494,883 | 1/1950 | Kroger et al. ........................ 313/109 |

OTHER PUBLICATIONS

"Fluorescent Lamps and Lighting," by Elenbaas et al., Chapter III, Sect. 3.9–3.12, pp. 58–64, 1962

Primary Examiner—Palmer C. Demeo
Attorney—A. T. Stratton and W. D. Palmer

[57] ABSTRACT

Discharge device incorporates phosphor combination wherein a first phosphor responds to ultraviolet excitation to provide an emission both in the visible and the ultraviolet. A second phosphor is excited by the ultraviolet emission of the first phosphor to emit in the visible, thereby to provide a very efficient composite emission.

5 Claims, 4 Drawing Figures

PATENTED DEC 26 1972
3,707,641
SHEET 1 OF 2
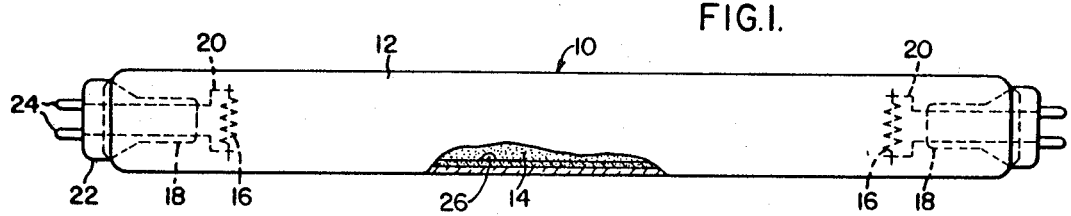
FIG.1.
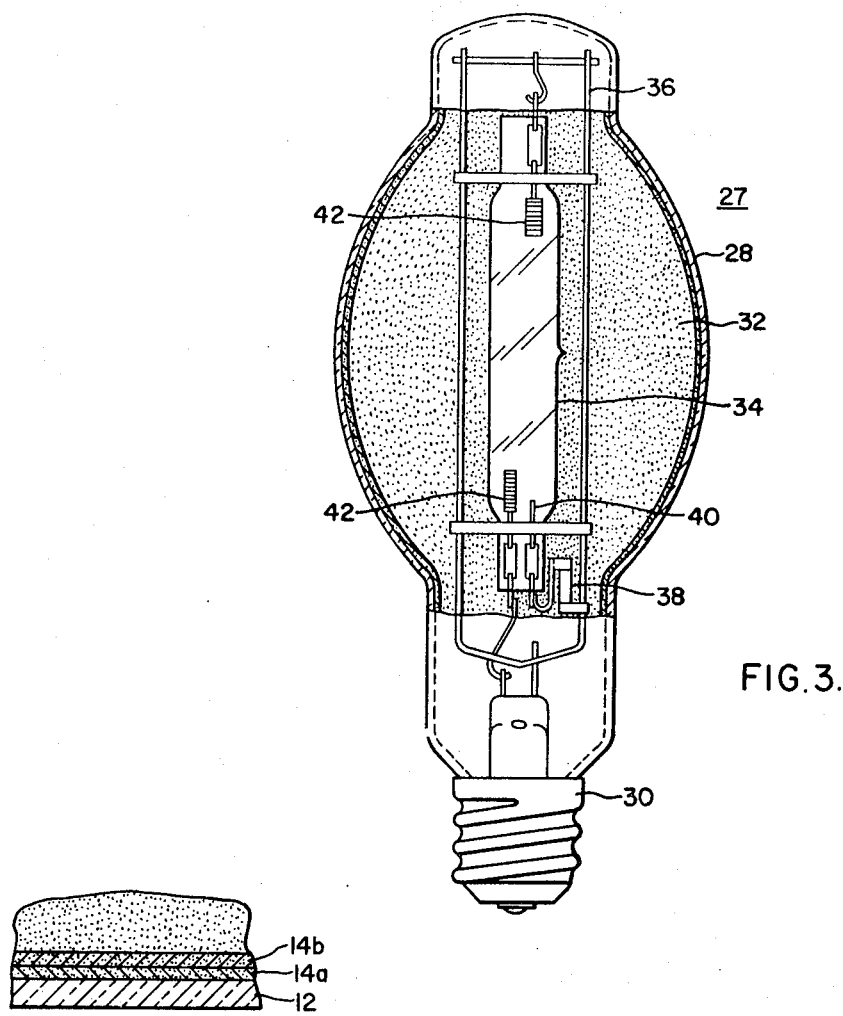
FIG.3.
FIG.2.
INVENTOR
William A. Thornton
BY
W. D. Palmer
ATTORNEY

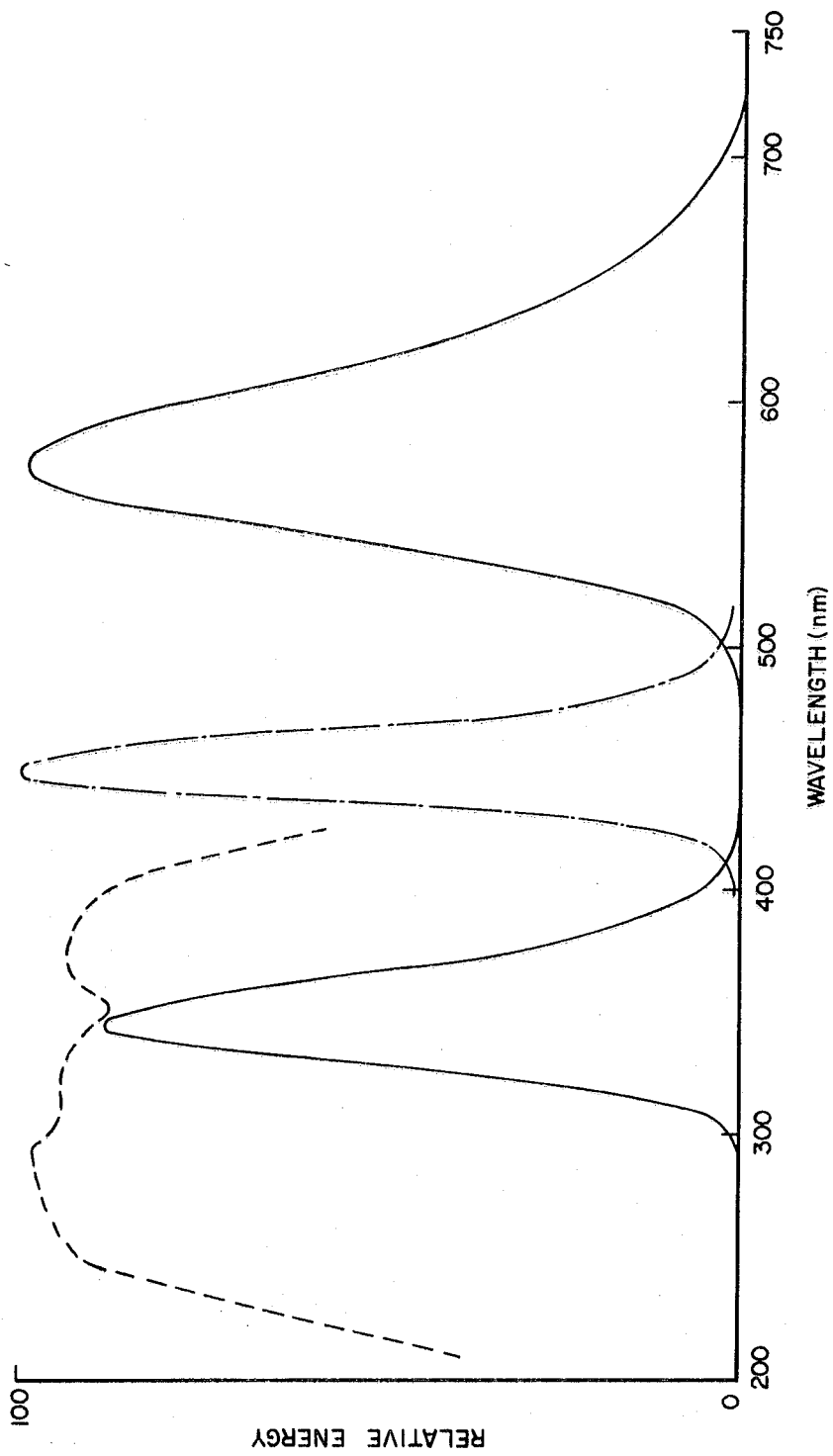

3,707,641

DISCHARGE DEVICE WHICH UTILIZES A MIXTURE OF TWO FLUORESCENT MATERIALS

BACKGROUND OF THE INVENTION

This invention relates to discharge devices and, more particularly, to discharge devices which utilize a particular blend or combination of different phosphor materials in order to produce a very efficient composite emission.

In a conventional fluorescent lamp, the low-pressure mercury discharge generates radiations having a wavelength of 254 nm, as well as some other ultraviolet wavelengths. The usual fluorescent lamp phosphor responds to excitation by the 254 nm ultraviolet radiations to produce visible light. Some of the most efficient and desirable phosphors which can be used in such fluorescent lamps respond to the 254 nm radiations in order to produce a desirable color of visible radiations, but also produce an undesirable amount of ultraviolet radiations having a wavelength longer than the initial exciting 254 nm ultraviolet radiations. This has limited the use of such phosphors since the unused ultraviolet radiations constitute wasted energy. This is particularly true in the case of green to red emitting fluorescent materials which are highly desirable materials for use in a fluorescent lamp.

Fluorescent materials which convert ultraviolet radiations into visible radiations also have utility in high-pressure mercury-vapor lamps, for example, where these phosphor materials are used to color correct the visible radiations produced by the high-pressure mercury-vapor arc.

SUMMARY OF THE INVENTION

There is provided a discharge device which comprises a sealed light-transmitting envelope which encloses a discharge-sustaining filling. As is conventional, electrodes are operatively disposed within the envelope and when the device is energized, a discharge is sustained between the electrodes which generates a substantial range of ultraviolet radiations, including a substantial proportion of 254 nm ultraviolet radiations. A phosphor combination is positioned in receptive proximity to the ultraviolet radiations generated by the discharge and this phosphor combination is operable, when excited by the discharge, to convert the ultraviolet radiations into visible radiations. The phosphor combination principally comprises two different phosphors, one of which constitutes the primary light-producing component of the phosphor combination and which exhibits an emission, when excited by the 254 nm radiations, which is principally located in the green-to-red region of the visible spectrum, in addition to an ultraviolet emission of a wavelength longer than 254 nm. The other of the phosphors of the combination is responsive to excitation by a broad range of ultraviolet radiations, including the ultraviolet emission of the first phosphor, in order to produce visible radiations of predetermined wavelengths. The relative proportions of the two phosphor components are predetermined in order to produce a composite predetermined color.

BRIEF DESCRIPTION OF THE DRAWINGS

For a better understanding of the invention, reference may be had to the preferred embodiment, exemplary of the invention, shown in the accompanying drawings in which:

FIG. 1 is an elevational view, partly broken away, illustrating a fluorescent lamp which incorporates the phosphor combination of the present invention;

FIG. 2 is an enlarged fragmentary view of a portion of a fluorescent lamp envelope illustrating an embodiment wherein the phosphor combination of the present invention is applied to the lamp envelope as two separate layers;

FIG. 3 illustrates a high-pressure mercury-vapor lamp, partly broken away, which incorporates a combination phosphor in accordance with the present invention; and FIG. 4 is a graph of relative energy versus wavelength illustrating emission and excitation spectra for a phosphor combination of the present invention.

DESCRIPTION OF THE PREFERRED EMBODIMENT

The numeral 10 in FIG. 1 indicates a fluorescent lamp comprising a tubular, vitreous envelope 12 coated internally with phosphor 14 which has been blended in accordance with the present invention. Sealed at each end of the envelope 12 are mounts each comprising an electrode 16, re-entrant stem press 18, and lead-in conductors 20. Base caps 22 and base pins 24 are provided at the envelope ends and the lamp contains a small charge of mercury 26 and inert ionizable starting gas such as four torrs of argon, as is conventional.

The phosphor layer 14 can be formed of a generally homogeneous blend of phosphor materials, as explained in greater detail hereinafter, or it can be applied in two different layers, as shown in enlarged form in FIG. 2, wherein the innermost layer 14a which is adjacent the envelope 12 is responsive to ultraviolet radiations produced by the layer 14b carried thereover in order to produce visible radiations, in accordance with the present invention.

In FIG. 3 is shown a high-pressure, mercury-vapor lamp 27 which comprises a radiation-transmitting outer envelope 28 having a conventional screw-type base 30 connected thereto. In accordance with the present invention, a composite phosphor is included as a layer 32 on the inner surface of the outer envelope 28. An arc tube 34 is supported within the outer envelope 28 by means of a conventional supporting frame 36. A starting resistor 38 connects a starting electrode 40 to the energizing potential and, during operation, the mercury arc is sustained within the arc tube 34 between operating electrode 42. With the exception of the special phosphor coating 32, the lamp 26 is conventional.

Both of the discharge devices shown in FIGS. 1 and 3 operate when energized to generate a substantial range of ultraviolet radiations including a substantial proportion of 254 nm radiations, and both devices utilize the phosphor combination of the present invention positioned in receptive proximity to the ultraviolet radiations generated by the discharge, in order to convert the ultraviolet radiations into visible radiations.

A specific example for the composite phosphor emission of a phosphor combination of the present invention is shown in detail in FIG. 4 wherein the solid lines indicate the response to 254 nm excitation of alkaline-earth metal pyrophosphate activated by cerium and manganese, which is a well-known fluorescent material and is described by Ranby, Mash and Henderson in British Journal of Applied Physics, Supplement 4 (1955). The radiations produced in the visible region of the spectrum peak at approximately 580 nm and the composite emission of the phosphor is generally orange in appearance. Such an emission is highly desirable for use in fluorescent lamps as a component of a blend. This pyrophosphate phosphor also has an emission peaking in the ultraviolet at about 340 nm and this ultraviolet emission is normally wasted energy. In accordance with the present invention, there is utilized, with the long wavelength emitting phosphor material, an additional phosphor which is excited by a broad range of ultraviolet radiations which include the ultraviolet emission of the pyrophosphate phosphor. As a specific example, such a phosphor is strontium chlorophosphate of an apatite structure which is activated by divalent europium, and such a phosphor is disclosed in detail in copending application Ser. No. 726,464, filed May 3, 1968, and owned by the present assignee. The excitation curve for such a phosphor is shown in dotted line and, as illustrated, the phosphor responds to excitation from approximately 210 nm to about 410 nm. The response of the phosphor when excited by any ultraviolet radiations within this broad range is shown as a dashed line in FIG. 4, which is a desirable narrow band blue emission. When the phosphors are mixed in the approximate proportions of 65 percent by weight pyrophosphate and 35 percent by weight chloro-apatite, the resulting composite emission appears white. As an example, the phosphor is coated in an amount of about 6 mg. per square cm. of coated area. If what is known as a cool white color is desired, approximately 20 percent by weight of manganese activated zinc silicate can be added as a blend component to the composite mixture.

For best efficiency, the phosphor which responds to a broad range of ultraviolet excitation preferably is located proximate the envelope, corresponding to the layer 14a in FIG. 2, and the primary light-producing phosphor component, such as the pyrophosphate in the foregoing example, is positioned thereover corresponding to the phosphor layer 14b as shown in FIG. 2. With such a double layer arrangement, the 254 nm ultraviolet radiations which are generated by the discharge serve primarily to excite the pyrophosphate in a very efficient manner to produce the orange-appearing band and the ultraviolet band. The chloro-apatite phosphor is efficiently excited by the ultraviolet radiations generated by the pyrophosphate, in order to convert these radiations to visible radiations.

While the pyrophosphate phosphor has been used as an example of a preferred embodiment, other known phosphors can be substituted therefor, such as calcium silicate which is activated by manganese and lead and, when excited by 254 nm ultraviolet radiations, produces a visible band peaking at about 622 nm and a broad ultraviolet band peaking at about 335 nm. As additional examples, strontium magnesium phosphate activated by tin emits a read-appearing band emission peaking at about 625 nm and an ultraviolet band which peaks at about 390 nm, barium-zinc silicate activated by manganese and lead emits a deep red-appearing band and an ultraviolet band peaking about 350 nm, and calcium-potassium fluoride activated by cerium and manganese emits both in the yellow-green and the ultraviolet. The chloro-apatite phosphor referred to herein-before will convert this ultraviolet band to a useful blue emission.

Other phosphors can be substituted for the foregoing chloro-apatite, and examples of such a phosphor are barium-strontium-magnesium silicate activated by divalent europium or calcium silicate activated by divalent europium.

As a general rule, the phosphor which emits the visible band and the ultraviolet band when excited by the 254 nm radiations should have a peak in the visible from the green-to-red region of the spectrum. If white light is desired, the phosphor which responds to the broad range of ultraviolet excitation preferably has an emission which is positioned in the shorter wavelength of the visible spectrum, but this is not necessary for some special applications where colored-appearing emissions are desired.

I claim:

1. In combination, a fluorescent lamp comprising a sealed light-transmitting elongated envelope, a discharge-sustaining filling enclosed by said envelope, electrodes operatively disposed within said envelope proximate the ends thereof and operable when energized to sustain a discharge therebetween to generate a substantial range of ultraviolet radiations including a substantial proportion of 254 nm radiations, and a phosphor combination carried on the interior surface of said envelope and operable when excited by said ultraviolet radiations to convert said ultraviolet radiations into visible radiations, said phosphor combination principally comprising two different phosphors, one of said phosphors constituting the primary light-producing component of said phosphor combination and having an emission when excited by said 254 nm radiations which is principally located in the longer wavelength region of the visible spectrum in addition to an ultraviolet emission of a wavelength longer than 254 nm, the other of said phosphors responsive to excitation by a broad range of ultraviolet radiations including the ultraviolet emission of said one phosphor to produce visible radiations of a generally bluish color, and the relative proportions of said one phosphor and said other phosphor being predetermined to produce a composite radiation of predetermined color.

2. The combination as specified in claim 1, wherein said one phosphor and said other phosphor are blended together.

3. The combination as specified in claim 1, wherein said phosphor combination is carried on said envelope in two discrete layers, and other phosphor is positioned nearest to said envelope, said one phosphor is carried over said other phosphor.

4. The combination as specified in claim 3, wherein said one phosphor is cerium- and manganese-activated alkaline-earth metal pyrophosphate, and said other phosphor is alkaline-earth phosphate of the chloro-apatite structure activated by divalent europium, with the weight ratio of said one phosphor to said other phosphor being about 65:35.

5. The combination as specified in claim 4, wherein there is also included in said phosphor combination a small amount of manganese-activated zinc silicate blended with said one phosphor, with the weight ratio of said silicate to said phosphor combination being about 1 to 5.

* * * * *